Dec. 28, 1943. W. G. CALKINS 2,337,588
COMPOSITE POROUS METAL ARTICLE
Filed Nov. 10, 1939
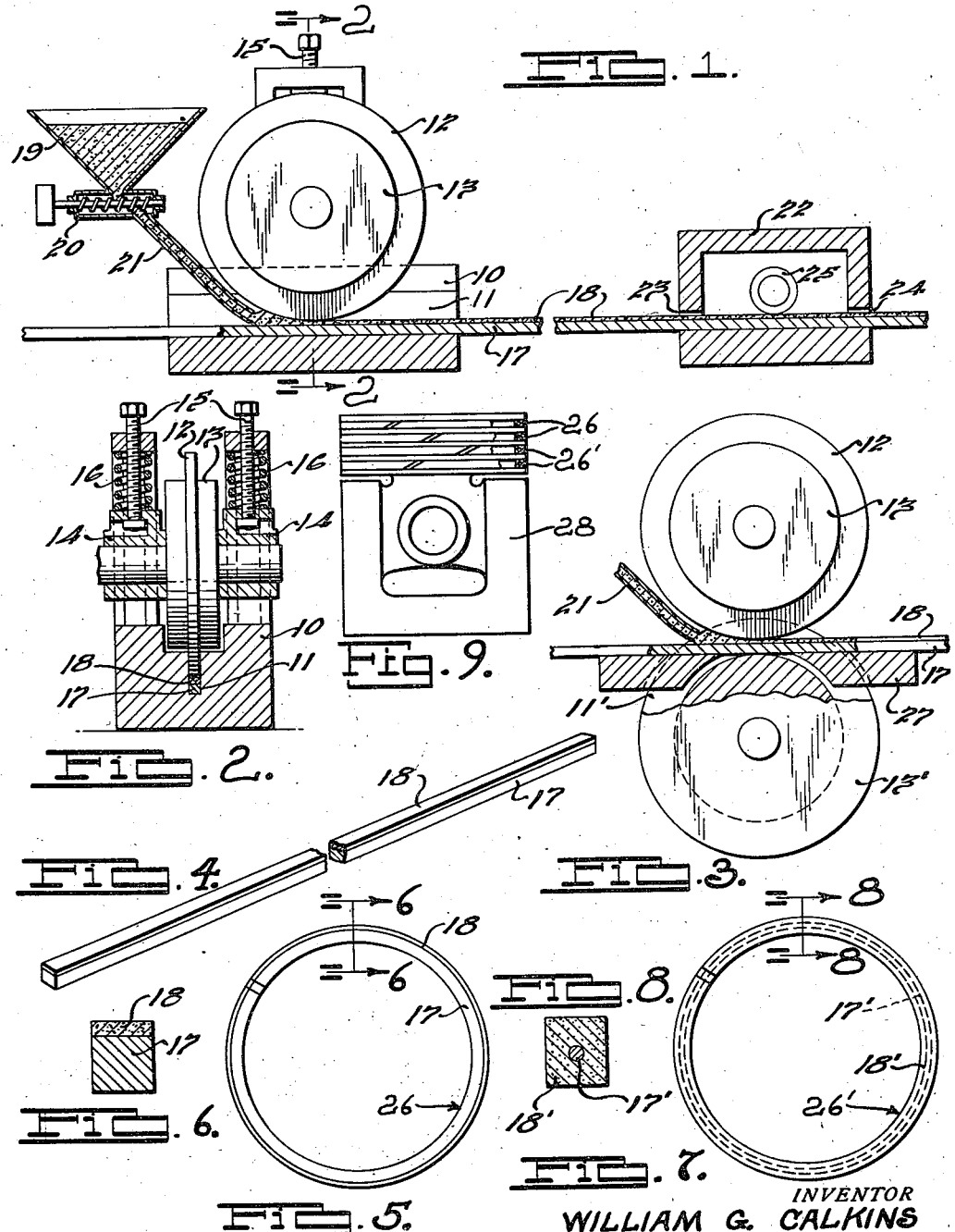
INVENTOR
WILLIAM G. CALKINS
BY
ATTORNEYS.

Patented Dec. 28, 1943

2,337,588

UNITED STATES PATENT OFFICE 2,337,588

COMPOSITE POROUS METAL ARTICLE

William G. Calkins, Detroit, Mich., assignor to Chrysler Corporation, Highland Park, Mich., a corporation of Delaware Application November 10, 1939, Serial No. 303,926

5 Claims. (Cl. 309—44)

This invention relates to an improved composite article of manufacture and method of making the same.

An object of the invention is the provision of an improved composite article of manufacture having a foraminous metal bearing surface of the character which has a substantial lubricant absorbing capacity.

More particularly, an object of the invention is the provision of an improved packing ring having a relatively low coefficient of friction and which has improved characteristics of strength and elasticity.

A further object of the invention is to provide a composite packing ring especially adapted for use in conjunction with a piston for an internal combustion engine and which has a bearing surface formed by a layer of porous metal bearing having a substantial lubricant absorbing capacity by which the structure is improved from the standpoint of scuffing and wear.

Another object of the invention is the provision of an improved method for manufacturing articles of the foregoing type, and more especially to provide an improved method for securing a foraminous bearing forming material to a reinforcing backing or support so that the bearing material is preferably rigidly bonded to the support.

More particularly, the invention has for its objects the provision of an improved method for manufacturing a composite ring-like member, such as a piston packing ring, preferably including a ferrous metal support or reinforcing part and a sheet-like porous bearing metal layer rigidly bonded thereto to provide a bearing surface; to provide an improved method for securing a mixture of finely divided particles of different materials to a support or backing of the foregoing type so that the resulting assembly, including the backing or support and the bearing forming layer, can be deformed to the desired shape and contour without impairing the structural characteristics thereof.

Other objects and advantages of the invention will be more apparent from the following description taken in connection with the accompanying drawing, wherein:

Fig. 1 is a side elevational view, partly in section, illustrating a suitable apparatus for manufacture of the improved ring.

Fig. 2 is a vertical sectional view taken on line 2—2 of Fig. 1.

Fig. 3 is a side elevational view, partly in section, of a modified form of a portion of the apparatus shown in Fig. 1.

Fig. 4 is a view in perspective of a blank prior to deformation thereof into ring shape.

Fig. 5 is a side elevational view of the ring.

Fig. 6 is a sectional view taken on line 6—6 of Fig. 5.

Fig. 7 is a side elevational view of a modified form of the ring.

Fig. 8 is a sectional view taken on the line 8—8 of Fig. 7.

Fig. 9 is a side elevational view of a piston, partly in section, embodying the rings shown in Figs. 6 and 7.

The apparatus shown in Figs. 1 to 3 is especially adapted for manufacture of the form of rings illustrated in Figs. 4, 5 and 6. This apparatus includes a suitable main die block 10, preferably of hardened steel and provided with a longitudinal slotted recess 11 in which the blade 12 of a circular briquetting roll 13 fits with relatively close clearance. Suitable means (not shown) may be provided for driving the roll 13 and the latter is supported by bearings indicated at 14 which are vertically adjustable through the pins 15 and the calibrated springs 16 in order to provide for pressure and size adjustment.

An elongated stock for the backing or support part 17 of the ring shown in Figs. 4, 5, 6 is preferably formed to the desired shape in cross section, the recess 11 of the block 10 being shaped to accommodate the stock and is suitably fed through this recess. In addition to the part 17, the ring has an outer portion 18 adapted to contact or engage the wall of the bore, for example, within which the piston and ring assembly operates. The portion 18 preferably comprises a mixture of powdered metals in a finely divided state and such other ingredients as may be desired, as will more fully hereinafter appear. The mixture is deposited in a hopper 19 from which it is fed by a conduit 20 to the upper side of the part 17 and passed with the latter between the roll 12 and the die block 10 and compressed to the desired thickness. The mechanism indicated at 21 is adjustable to predetermine and control the amount of the mixture fed from the hopper.

While a large variety of mixtures of powdered metals and other ingredients may be used, it has been found that the following composition provides a satisfactory structure where same is embodied in a piston packing ring, as illustrated herein:

| | Percent by weight |
|---|---|
| Powdered copper | 88.5 |
| Powdered tin | 10.00 |
| Powdered graphite | 1.50 |

The percentages of the materials used in the foregoing composition may be varied, the particular proportions recited being given merely as an example of a composition which, it has been found, may be readily compressed according to the method herein disclosed. Any suitable solid lubricating material such as exfoliate mica or powdered boric acid may be used in place of graphite and in some mixtures liquid lubricant such as ordinary lubricating oil may be employed.

Disposed adjacent the discharge end of the block 10 is a furnace 22 having an inlet opening 23 registering with the latter for receiving the composite stock as it is discharged from the block and roller, and an outlet opening 24. The furnace preferably has a non-oxidizing reducing atmosphere provided, for example, by supplying either hydrogen or illuminating gas of a reducing atmosphere to the interior thereof for sintering and bonding. The furnace is preferably maintained at a temperature slightly above the melting point of one of the powdered metal constituents of the mixture and below the melting point of the other metal. Thus, the metal having the lower melting point fuses with surface portions of the metal having the higher melting point so as to be firmly bonded together while leaving sufficient voids therein to render the resulting product foraminous or porous throughout and capable of retaining a substantial lubricant absorbed content. At the same time the part 18 is rigidly bonded to the part 17, the latter preferably being a ferrous metal such as steel for example where the structure is embodied in a packing ring. For the purpose of creating pressure on the stock to provide a better bond, a roller 25, positioned within the furnace, engages the stock as it is passed through the latter.

The assembly as received from the furnace may be of such length as desired, it being understood that it preferably has a flat contour, and the assembly may be cut to the desired length or if desired the assembly may initially have the required length for the article, all as shown in Fig. 4. Sufficient excess stock of both parts 17 and 18 is allowed for finish grinding, turning or other machining operation which may be desired. For the manufacture of piston packing rings, the backing or support 17 preferably has a composition of suitable carbon and alloy content to give the required physical properties, such as hardness, tension and elastic limits, and for straight or formed bearings a relatively soft low carbon steel may be used. The assembly as shown in Fig. 4 may be rolled by dies or other suitable apparatus to form the split ring 26 shown in Fig. 5 where the structure is to constitute a piston packing ring. It will be understood that the aforesaid machining operations can be performed after the assembly has assumed the shape illustrated in Fig. 5.

After the assembly has passed through the furnace it may be submerged in a suitable oil bath so as to impregnate the porous metal layer with a suitable lubricant. However, where the structure is embodied in a piston packing ring this operation is not necessary inasmuch as the ring will be subjected to an oil bath during conventional operation in the cylinder bore.

Referring to Fig. 3 wherein there is illustrated a modified form of a portion of the apparatus shown in Fig. 1, the roll 13 is employed in conjunction with a second pressure roll 13' having therein a groove 11' similar to the groove 11. A suitable supporting member 21 is provided for the work as it is subjected to pressure between the rolls 13 and 13'. The modified form is particularly adapted for use where relatively high unit pressure are required, and pressure adjusting mechanism similar to that embodied in the main showing may be utilized.

A modified form of the piston packing ring 26' is shown in Figs. 7 and 8, and includes a core ring or reinforcing ferrous metal element 17' encased by a mass of sintered powdered metal 18' of a composition as set forth for the ring 26. In this form of the invention the metal 18' encases the ring 17', providing a bearing surface for each of the four sides of the ring, and is directly and rigidly bonded thereto.

The ring 26' can be produced, for example, by placing a charge of the mixture of finely divided particles in a female die part suitably positioning the core 17' therein, feeding an additional charge of the mixture to cover the core 17' and compressing with a suitable male die part to briquette the powdered metal mixture. The resulting assembly may then be passed through a furnace as illustrated at 22 to sinter the mixture and bond the same to the core 17', as set forth in connection with the ring 26, and the required machining and forming operations performed as specified heretofore to provide the split ring 26'.

In Fig. 9 there is illustrated a piston 28, conventionally used in internal combustion engines, utilizing the packing rings 26 and 26'. The porous metal parts 18 and 18' of these respective rings provide a porous bronze bearing surface which has a relatively low coefficient of friction and which, by reason of capillary lubricant distribution, is particularly advantageous from the standpoint of scuffing and wear. Furthermore, the steel support or reinforcing parts 17 and 17' lends to the ring strength and elasticity far in excess of the properties obtainable in a cast iron ring, for example.

Although but two embodiments of the invention is herein shown and described, it will be understood that various changes in the size, shape and arrangement of parts may be made without departing from the spirit of our invention and it is not our intention to limit said invention other than by the terms of the appended claims.

What I claim:

1. A piston packing ring including a split elastic reinforcing backing and a bearing portion engageable with the wall of the bore receiving the piston and comprising a sheet-like porous bearing metal layer rigidly bonded thereto.

2. A piston packing ring including a ferrous metal insert supporting part and a bearing portion engageable with the wall of the bore receiving the piston and comprising porous bearing metal rigidly bonded thereto.

3. A piston packing ring including a resilient split reinforcing steel ring and a relatively thin layer of bearing material secured to said ring and engageable with the wall of the bore receiving the piston, said material comprising a mass of foraminous sintered powdered metal having a plurality of voids therein adapted to absorb a substantial lubricant content.

4. In a piston packing ring, the combination of an annular resilient split steel backing and a porous bearing portion consisting of a sintered mixture of finely divided particles of copper and tin rigidly surface bonded to the radially outer face of said backing.

5. In a piston packing ring, the combination of an annular ferrous metal core, and a bearing forming surface enveloping said core and comprising a mass of sintered porous bearing material surface bonded to said core.

WILLIAM G. CALKINS.